United States Patent
Sparks et al.

(10) Patent No.: US 12,441,867 B2
(45) Date of Patent: Oct. 14, 2025

(54) STABILIZING COMPONENT FOR POLYAMIDE RESIN COMPOSITION

(71) Applicant: Ascend Performance Materials Operations LLC, Houston, TX (US)

(72) Inventors: Bradley J. Sparks, Houston, TX (US); Nanayakkara Somasiri, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 53 days.

(21) Appl. No.: 17/949,545

(22) Filed: Sep. 21, 2022

(65) Prior Publication Data
US 2023/0092193 A1    Mar. 23, 2023

Related U.S. Application Data

(60) Provisional application No. 63/246,371, filed on Sep. 21, 2021.

(51) Int. Cl.
C08K 3/105      (2018.01)
C08K 3/32       (2006.01)

(52) U.S. Cl.
CPC ............... C08K 3/105 (2018.01); C08K 3/32 (2013.01); *C08K 2201/014* (2013.01)

(58) Field of Classification Search
CPC .......................... C08K 3/105; C08K 2201/014
See application file for complete search history.

(56) References Cited

U.S. PATENT DOCUMENTS

| | | | |
|---|---|---|---|
| 2,705,227 | A | 3/1955 | Stoeff |
| 3,505,285 | A | 4/1970 | Hermann et al. |
| 5,618,864 | A | 4/1997 | Court |
| 5,726,278 | A | 3/1998 | Kenmochi |
| 5,763,561 | A | 6/1998 | Keske |
| 9,115,247 | B2 | 8/2015 | Shikano et al. |
| 10,301,469 | B2 | 5/2019 | Jung et al. |
| 10,854,859 | B2 | 12/2020 | Shi |
| 2014/0288220 | A1 | 9/2014 | Duncan et al. |
| 2017/0313843 | A1* | 11/2017 | Blondel ............... B32B 27/32 |
| 2019/0248986 | A1 | 8/2019 | Bergmann |
| 2020/0216613 | A1 | 7/2020 | White |
| 2020/0299507 | A1 | 9/2020 | Blondel et al. |

FOREIGN PATENT DOCUMENTS

| | | |
|---|---|---|
| EP | 1121388 B1 | 1/2005 |
| WO | 2000022035 A1 | 4/2000 |
| WO | 2000022036 A1 | 4/2000 |
| WO | 2017174948 A1 | 10/2017 |

OTHER PUBLICATIONS

"International Search Report and Written Opinion" issued in PCT/US2022/044220, dated Dec. 14, 2022, 12 pages.

* cited by examiner

*Primary Examiner* — Wenwen Cai
(74) *Attorney, Agent, or Firm* — Womble Bond Dickinson (US) LLP

(57) ABSTRACT

Polyamide resin that comprise one or more polyamides and a stabilizer component containing an copper complex and a copper salt is disclosed for improving the heat age performance for an article. The combination of a copper complex and a copper salt retains the mechanical properties of the article.

18 Claims, No Drawings

STABILIZING COMPONENT FOR POLYAMIDE RESIN COMPOSITION

CROSS-REFERENCE TO RELATED APPLICATION

This application claims priority to U.S. Provisional Application No. 63/246,371, filed on Sep. 21, 2021, which is incorporated herein by reference.

FIELD

The present invention relates to a polyamide resin composition. In particular, the present invention relates to a polyamide resin composition having a stabilizing component that demonstrates exceptional mechanical properties.

BACKGROUND

Polyamide resins have good balance of mechanical properties, molding processability and chemical resistance, which allows for use in a variety of engineering plastics applications including, such as fasteners, circuit breakers, terminal blocks, connectors, automotive parts, furniture parts, appliance parts, cable ties, sports equipment, gun stocks, window thermal breaks, aerosol valves, food film packaging, automotive/vehicle parts, textiles, industrial fibers, carpeting, or electrical/electronic parts.

Despite the variety of uses, polyamides are susceptible to environment conditions that can degrade the performance characteristics. Generally polyamide have a working temperature range from −40° C. to 85° C. At temperature below −40° C. the polyamide becomes very brittle. In addition, at higher temperature polyamide can suffer a number of problems. The polyamide may, for example, become brittle or discolored. Furthermore, desirable mechanical properties of the polyamide, such as tensile strength and impact resilience, typically diminish from exposure to high temperatures.

To improve its mechanical properties of polyamide reinforcing fillers, such as glass fillers, are added, but this leads to drawbacks. For example, at high reinforcing filler contents, the part or component made from the reinforced polyamide has very poor surface appearance, and presents process difficulties for injection molding processes.

There is a growing need in particle applications to further improve the heat resistance of polyamides that are exposed to high temperatures during their lifecycles. To extend the performance, certain heat stabilizers are used to provide additional thermal protection up to 125° C. Even with these stabilizers other performance characteristics may also suffer which is undesirable.

For example, the addition of conventional heat stabilizer packages has been shown to be moderately effective against thermooxidative damage, but typically these heat stabilizer packages merely delay the damage. In addition, conventional stabilizer packages have been found to be ineffective over higher temperature ranges, e.g., over particular temperature gaps.

While many of these stabilizer packages may improve performance at some temperatures, each stabilizer package often presents its own set of additional shortcomings. Stabilizer packages that utilize iron-based stabilizers, for example, are known to require a high degree of precision in the average particle size of the iron compound, which presents difficulties in production. Furthermore, these iron-based stabilizer packages demonstrate stability issues, e.g., the polyamide may degrade during various production stages. As a result, the residence time during the various stages of the production process must be carefully monitored. Similar issues are present in polyamides that utilize zinc-based stabilizers.

US Pub. No. 2020/0299507 describes a composition comprising: 70 to 91% by weight of at least one semi-crystalline polyamide, 5 to 25% by weight of at least one polyolefin having an epoxy, anhydride or acid function introduced by grafting or copolymerisation, 3 to 20% by weight of at least one plasticizer, 0.05 to 5% by weight of at least one stabilizer on the basis of a copper complex, and at least one catalyst, said composition being free from alkaline metal halide and oligo- or polycarbodiimide.

US Pub. No. 2014/0041159 describes cable ties made from a polyamide composition formed from a low viscosity polyamide-6 and a nucleating agent including an organic material, e.g. organic polymers, and an inorganic metallic material, e.g., metal oxides and silicates.

EP Pub. No. 1,121,388 describes a stabilized polyamide composition characterized in the at least one copper complex and at least one organic halogen compound are contained as stabilizer.

Semi-aromatic polyamides are thermoplastics that have a good range of properties for certain high temperature applications. U.S. Pat. No. 10,854,869 discloses compounds comprising a semi-aromatic polyamide component comprising recurring terephthalamide and/or isophthalamide units, an impact modifier component comprising a modified polyolefin elastomer, one or more synergistic blends of sterically hindered phenolic stabilizers and phosphonates and one or more relatively high molecular weight organic phosphite stabilizers, and a fine talc nucleating agent.

Thus, even in view of the references, the need exists for improved polyamide resin compositions with stabilizers that improve the working temperature range without suffering from degradation in performance.

SUMMARY

There is provided a polyamide resin composition with a dual heat stabilizer system that has good retention performance for extended periods of time at higher temperatures. Retention performance may be include at least one of the following tensile strength, elongation, impact strength. The dual heat stabilizer system is beneficial to retain these initial properties. In one embodiment, at least one of these performance values is retained after 2500 hr at a temperature of 150° C. In one embodiment, the polyamide resin composition maintains at least 80% of the initial tensile strength after 1500 hours at a temperature from 140° C. to 160° C. In one embodiment, polyamide resin composition maintains at least 5% of the initial elongation after 1500 hours at a temperature from 140° C. to 160° C. In one embodiment, polyamide resin composition maintains at least 25% of the initial impact strength after 3000 hours at a temperature from 140° C. to 160° C.

In one aspect, the present disclosure describes a polyamide resin composition comprising a resin component containing greater than or equal to 75 wt. % of a polyamide containing an aliphatic diamine having 6 or more carbon atoms and an aliphatic diacid having 6 or more carbon atoms ("first polyamide"), and less than or equal to 25 wt. % of polyamide containing caprolactam ("second polyamide"), and a stabilizer component containing a copper complex and a copper salt, wherein the amount of copper provided by the copper complex and copper salt is in a weight ratio from 10:90 to 90:10. In one embodiment, the resin component is present in an amount that is greater than 70 wt. %, and in particular from 70 to 99.5 wt. %, based on the total weight of the polyamide resin composition. The stabilizer component may be present in an amount from 0.1 to 15 wt. % based on the total weight of the polyamide resin composition. In one embodiment, the copper complex comprises a ligand and/or a halogenated organic compound, such as a bromine-based compound. The ligand may be a phosphine, mercaptobenzimidazole, acetylacetonate, glycine, ethylenediamine, oxalate, diethylenediamine, triethylenetetraamine, ethylenediaminetetraacetic acid, pyridine, diphosphone, dipyridyl, or mixtures thereof. The copper complex may be in an amount from 0.1 to 5 wt. % based on the total weight of the polyamide resin composition. In one embodiment, the copper salt may be cuprous iodide, cuprous cyanide, cupric acetate, cupric stearate, or mixtures thereof. The copper salt further comprises an alkali metal halide, such as lithium iodide, sodium iodide, or potassium iodide, or mixtures thereof. The total halogen loading may be less than or equal to 5 wt. % based on the total weight of the polyamide resin composition. The copper salt may be in an amount from 1 to 5 wt. % based on the total weight of the polyamide resin composition. In one embodiment, the resin component comprises from 75 to 100% of the polyamide containing an aliphatic diamine having 6 or more carbon atoms, preferably 6 carbon atoms, and an aliphatic diacid having 6 or more carbon atoms, preferably 6 carbon atoms ("first polyamide"). In one embodiment, the resin component may also comprise comprises from 0 to 25% of the polyamide containing caprolactam ("second polyamide"). In some embodiments, the resin composition further comprises a lubricant, dye, pigment, optical brightener, UV stabilizer, or combinations thereof. The polyamide resin composition is preferably a non-filled composition, meaning that no fillers or other reinforcing materials are used (0% filler content). In addition, the polyamide resin composition contains no polyolefins, plasticizers and/or impact modifiers. The stabilizer component attributes to maintaining or retaining acceptable mechanical performance, including maintaining/retaining at least 80% of the initial tensile strength, at least 5% of the initial elongation and/or at least 25% of the initial impact strength after 1500 hours at a temperature from 140° C. to 160° C. In some embodiments, the articles formed from the polyamide resin composition comprise fastener, circuit breaker, terminal block, connector, automotive interior component, automotive engine component, furniture part, appliance part, cable tie, sports equipment, gun stock, window thermal break, aerosol valve, food film packaging, or electrical/electronic component.

In one aspect, the present disclosure describes a cable tie made from a polyamide resin composition comprising a resin component containing greater than or equal to 75 wt. % of a polyamide containing an aliphatic diamine having 6 or more carbon atoms and an aliphatic diacid having 6 or more carbon atoms ("first polyamide"), and less than or equal to 25 wt. % of polyamide containing caprolactam ("second polyamide"), and a stabilizer component containing a copper complex and a copper salt, wherein the amount of copper provided by the copper complex and copper salt is in a weight ratio from 10:90 to 90:10.

DETAILED DESCRIPTION

Introduction

The present invention relates to polyamide resin composition having improved heat resistance. In one embodiment, the polyamide resin composition comprises a stabilizer component containing copper that is provided by two different copper sources. In some embodiments, the stabilizer component comprises a copper complex having copper that is bound and also a copper salt. The stabilizer component may be used with polyamide resin compositions that are non-filled and contain no reinforced fillers, talc, or glass fibers.

The stabilizer component is particularly effective for providing heat resistance for temperatures up to 160° C., and in particular from 140° C. to 160° C. and for retaining acceptable mechanical properties in terms of tensile strength, elongation and/or impact strength over extended periods of time. This allows the polyamide resin compositions with the stabilizer component to be used in a variety of applications that are exposed to high temperature during their lifecycle.

Resin Component

The polyamide resin composition is primarily composed of a resin component in an amount from 70 to 99.5 wt. % based on the total weight of the polyamide resin composition, e.g., from 71 to 99 wt. %, from 75 to 99 wt. %, from 80 to 99 wt. %, from 85 to 99 wt. %, from 90 to 99 wt. %, or from 95 to 99 wt. %.

In one embodiment, the resin component comprises greater than or equal to 75 wt. % of a polyamide containing an aliphatic diamine having 6 or more carbon atoms and an aliphatic diacid having 6 or more carbon atoms, which may be referred to as a first polyamide, and less than or equal to 25 wt. % of polyamide containing caprolactam, which may be referred to as a second polyamide. In one preferred embodiment, the resin component comprises greater than or equal to 75 wt. % of the first polyamide, and less than or equal to 25 wt. % of the second polyamide. The first and second polyamide may be separate polyamide or copolymerized with another polyamide. In general, the polyamides may be formed by condensing of diamines or diacids, and/or by the ring opening of lactams. In some embodiments, the resin components does not contain aromatic or cyclic diacids or diamines. In addition, the diacids or diamines having 5 or fewer carbon atoms are not particularly desired.

In one embodiment, the resin component comprises greater than or equal to 75 wt. % of first polyamide, e.g., greater than 77 wt. %, greater than 80 wt. %, greater than 85 wt. %, greater than 87 wt. %, greater than 90 wt. %, greater than 91 wt. %, greater than 95 wt. %, or greater than 97 wt. %. This is based on the total weight of the resin component, not including the stabilizer component or other additives described herein. In terms of ranges, the resin component contains from 75 to 100 wt. % of a polyamide containing an aliphatic diamine having 6 or more carbon atoms and an aliphatic diacid having 6 or more carbon atoms, e.g., from 75 to 99.5 wt. %, from 75 to 98.5 wt. %, from 75 to 97.5 wt. %, from 75 to 95 wt. %, from 75 to 90 wt. %, or from 75 to 87 wt. %. When the resin component comprises 100 wt. % of a first polyamide, the resin composition does not comprise the second polyamide or any other type of polyamide such aromatic or cyclic.

The polyamide may comprise an aliphatic diamine acid having 6 or more carbon atoms including hexanediamine, heptanediamine, octanediamine, nonanediamine, decanediamine, undecanediamine, dodecanediamine, tridecanediamine, tetradecanediamine, hexadecanediamine, octadecenediamine, octadecenediamine, eicosanediamine, docosanediamine or mixtures thereof. Preferably, the aliphatic diamine is hexanediamine and at least 90% of the aliphatic diamine having 6 or more carbon atoms is hexanediamine. In some embodiments, the aliphatic diamine is not modified. Further, cycloaliphatic and aromatic diamines may be excluded from the resin component.

The polyamide may comprise an aliphatic diacid having 6 or more carbon atoms including adipic acid, heptanedioic acid, octanedioic acid, azelaic acid, sebacic acid, undecanedioic acid, dodecanedioic acid, brassylic acid, tetradecanedioic acid, hexadecanedioic acid, octadecanedioic acid, octadecenedioic acid, eicosanedioic acid, docosanedioic acid or mixtures thereof. Preferably, the aliphatic diacid is adipic acid and at least 90% of the aliphatic diacids having 6 or more carbon atoms is adipic acid. In some embodiments, the aliphatic diacid is not modified. Further, cycloaliphatic and aromatic diacids are excluded from the resin component.

In one embodiment, the resin component comprises a polyamide composed mainly of hexamethylenediamine and adipic acid referred to as poly[imino(1,6-dioxohexamethylene) iminohexamethylene] or polyamide 66 (PA66). In one embodiment, the resin component comprises greater than or equal to 75 wt. % of PA66, e.g., greater than 77 wt. %, greater than 80 wt. %, greater than 85 wt. %, greater than 87 wt. %, greater than 90 wt. %, greater than 91 wt. %, greater than 95 wt. %, or greater than 97 wt. %. In terms of ranges, the resin component contains from 75 to 99.5 wt. % of PA66, e.g., from 75 to 98.5 wt. %, from 75 to 97.5 wt. %, from 75 to 95 wt. %, from 75 to 90 wt. %, or from 75 to 87 wt. %.

The first polyamide, containing an aliphatic diamine having 6 or more carbon atoms and an aliphatic diacid having 6 or more carbon atoms, may have an amine end group (AEG) level that ranges from 50 µeq/gram to 90 µeq/gram. Amine end groups are defined as the quantity of amine ends (—NH$_2$) present in a polyamide. AEG calculation methods are well known. In some embodiments, the AEG level may range from 50 µeq/gram to 90 µeq/gram, e.g., from 55 µeq/gram to 85 µeq/gram, from 60 µeq/gram to 90 µeq/gram, from 70 µeq/gram to 90 µeq/gram from 74 µeq/gram to 89 µeq/gram, from 76 µeq/gram to 87 µeq/gram, 78 µeq/gram to 85 µeq/gram, from 60 µeq/gram to 80 µeq/gram, from 62 µeq/gram to 78 µeq/gram, from 65 µeq/gram to 75 µeq/gram, or from 67 µeq/gram to 73.

The resin component may also comprise less than or equal to 25 wt. % of polyamide containing caprolactam ("second polyamide"), e.g., less than 22 wt. %, less than 20 wt. %, less than 15 wt. %, less than 10 wt. %, or less than 5 wt. %. In terms of ranges, the resin component may comprise a second polyamide in an amount from 0 to 25 wt. %, e.g., from 5 to 22 wt. %, from 5 to 20 wt. %, from 10 to 20 wt. %, or from 15 to 20 wt. %. When the resin component does not contain any second polyamide containing caprolactam, the resin component contains primarily the polyamide containing an aliphatic diamine having 6 or more carbon atoms and an aliphatic diacid having 6 or more carbon atoms. In other embodiments, the resin component comprises a combination of first polyamides and second polyamides, or copoylmers thereof, wherein the resin component may comprise the second polyamide in an amount from 1 to 25 wt. %, e.g., from 5 to 22 wt. %, from 5 to 20 wt. %, from 10 to 20 wt. %, or from 15 to 20 wt. %.

In one embodiment, the weight ratio of the first polyamide to second polyamide (i.e. weight ration of the polyamide containing an aliphatic diamine having 6 or more carbon atoms and an aliphatic diacid having 6 or more carbon atoms to the polyamide containing caprolactam) is from 75/25 to 100/0, and in particular from 75/25 to 90/15, from 75/25 to 85/15, or from 80/20 to 85/15. Higher amounts of the second polymer may reduce processability.

The polyamide containing caprolactam preferably is primarily caprolactam and contains more than 90% of caprolactam, e.g., more than 95% or more than 97%. A preferred polyamide containing caprolactam is poly(azepan-2-one), also known as polyamide 6 (PA6). The second polyamide may comprise other polyamides containing γ-butyro lactam, capryllactam, lauryllactam, or combinations thereof. Suitable polyamide-6 materials are generally formed by reacting caprolactam and aminocaproic acid under temperature conditions suitable to initiate polymerization. Different PA6 can be produced by changing the reaction time and/or temperature, by the inclusion of catalysts and by forming various end groups. Commercially available PA6 may be obtained from a variety of manufactures including Vydyne PA6 from Ascend Performance Materials, Aegis™ polyamide-6 products available from Honeywell, nylon polyamide-6 products available from DuPont, Ube polyamide-6 products available from Ube Industries, Amilan polyamide-6 products available from Toray, and Leona polyamide-6 products available from Asahi.

In some embodiments, the resin component comprises a polyamide having a melt temperature of 250° C. or less, e.g., 240° C. or less, 235° C. or less, 230° C. or less, 225° C. or less, 220° C. or less, 215° C. or less, 210° C. or less, 205° C. or less. The melt temperature of the polyamide may be greater than or equal to 175° C., e.g., greater than or equal to 180° C., greater than or equal to 190° C., greater than or equal to 200° C., or greater than or equal to 210° C.

The polyamide used for the resin component preferably has a number-average molecular mass Mn that is greater than or equal to 20,000, e.g., greater than or equal to 30,000 or greater than or equal to 40,000, and advantageously between 20,000 and 80,000. The polyamide weight-average molecular mass Mw is generally greater than 40,000 and advantageously between 50,000 and 100,000, and in some embodiments may range up to 200,000.

In one embodiment, the polyamide used in the resin composition may have a relative viscosity (RV) from 5 to 200, e.g., from 10 to 100, from 10 to 75, from 20 to 75, from 20 to 70, from 30 to 60, or from 40 to 60.

Stabilizer Component

In one embodiment, the stabilizer component comprises copper. The copper is preferably provided by at least two different copper sources (a "dual copper stabilizer"). In one embodiment, the stabilizer component comprises at least one copper complex and at least one copper salt. Together the different copper sources may constitute a heat stabilizer package. This stabilizer package allows the polyamide resin composition to retain mechanical properties after heat aging.

For purposes of the disclosed embodiments, the stabilizer component is based on copper and does not include cerium-based stabilizers or melamine-based stabilizers.

The copper complex may include a bound copper. The copper may be bound by a ligand. In some embodiments, the ligand of the copper complex may be a phosphine, mercaptobenzimidazole, acetylacetonate, glycine, ethylenediamine, oxalate, diethylenediamine, triethylenetetraamine, ethylenediaminetetraacetic acid, pyridine, diphosphone, dipyridyl, or mixtures thereof. Phosphines in particular include alkylphosphines, such as tributylphosphine, or arylphosphines such as triphenylphosphine (TPP). In a preferred embodiment the ligand is triphenylphosphine, mercaptobenzimidazol, or a mixture thereof.

The amount of copper in the copper complex may be from 10 to 1000 wppm based on the total weight of the polyamide resin composition, e.g. from 10 to 800 wppm, from 10 to 500 wppm, from 20 to 500 wppm, from 20 to 400 wppm, from 20 to 300 wppm, from 20 to 250 wppm, from 20 to 200 wppm, from 20 to 150 wppm, or from 50 to 150 wppm. In one embodiment, the stabilizer operates efficiently when the total amount of copper is less than 1000 wppm, e.g., less than 950 wppm, less than 900 wppm, less than 800 wppm, less than 500 wppm, less than 400 wppm, less than 300 wppm, less than 250 wppm, less than 200 wppm, or less than 150 wppm. To provide an effective amount of copper the complex may have greater than 10 wppm of copper, e.g., greater than 50 wppm, greater than 75 wppm, greater than 100 wppm, greater than 150 wppm, greater than 200 wppm, or greater than 250 wppm.

In some embodiments, the copper complex further comprises a halogenated organic compound. Suitable halogenated organic compounds include a bromine-based compound and/or an aromatic compound. The halogenated organic compound may be decabromodiphenyl, decabromodiphenyl ether, bromo styrene oligomers, chloro styrene oligomers, polydibromostyrene, tetrabromobisphenyl-A, tetrabisphenyl-A derivatives, chloro dimethanedibenzo(a,e) cyclooctene derivatives, or mixtures thereof. In one embodiment, the copper:halogen mole ratio is from 1:1 to 1:3000, e.g., from 1:1 to 1:1000, from 1:1 to 1:500, from 1:2 to 1:500, from 1:2 to 1:100, from 1:2 to 1:50, or from 1:1.5 to 1:15.

Commercially available copper complexes may include Bruggolen® H3386, Bruggolen® H3376, Bruggolen® H3344 and Bruggolen® H3350 available from Brüggemann.

In one embodiment, the copper salt may comprise a halide salt or an organic salt. Suitable halide salts include cuprous chloride, cuprous bromide, cuprous fluoride and cuprous iodide, or mixtures thereof. In a preferred embodiment, the copper salt is cuprous iodide. In some embodiments, the copper salts may be carboxylic acids having 2 to 18 carbon atoms, such as cupric acetate, cupric naphthenate, cupric caprate, cupric laurate and cupric stearate; cupric thiocyanate; cupric nitrate; cupric acetylacetonate; cuprous (I) oxide; and cupric (II) oxide. In one embodiment, the copper salt is cuprous iodide, cuprous cyanide, cupric acetate, or cupric stearate, or mixtures thereof. The above copper salts can be used singly or in combination.

In some embodiments, the copper salt may also comprise an alkali metal halide. The alkali metal halide includes a fluoride, bromide or iodide of lithium, sodium or potassium. Of them, potassium iodide is preferable. Such alkali metal halide can be used independently with the copper salts or in combination. The use of such an alkali metal halide improves the dispersion of the copper salt in the polyamide resin composition and consequently, the weather resistance of the composition is improved.

The alkali metal halide is used preferably in such an amount that the number of halogen atoms of the alkali metal halide per one copper atom of the copper salt ranges from 0.3 to 4, particularly from 0.3 to 3.0, from 0.3 to 2.5, from 0.3 to 2.0, or from 0.4 to 2.0.

In some embodiments, the total halogen loading in the composition is less than or equal to 5 wt. % based on the total weight of the polyamide resin composition, e.g., less than 4 wt. %, less than 3 wt. %, less than 2.5 wt. %, less than 2 wt. %, less than 1.5 wt. %, less than 1.0 wt. %, or less than 0.5 wt. %. As described herein the composition allow the producer to use reduce levels of stabilizer that would provide improvements to process while providing a significant cost advantage.

In one embodiment, the stabilizer component contains a copper complex and a copper salt, wherein the weight ratio of copper provided by the copper complex to copper provided by the copper salt is from 10:90 to 90:10, e.g., from 20:80 to 80:20, from 25:75 to 75:25, from 30:70 to 70:30, from 40:60 to 60:40, from 45:55 to 55:45, or 50:50. When loaded in such ratios, the stabilizer component is thermally stable and does not cause decomposition of first or second polyamides during processing and does not affect the composition during the production process. In one embodiment, the copper provided by the copper complex and the copper provided by the copper salt may be substantially equal. In some cases, there is more copper provided by the copper salt than from the copper complex, wherein the weight ratio of copper provided by the copper complex to copper provided by the copper salt is from 10:90 to 50:50, e.g., from 20:80 to 50:50, from 25:75 to 50:50, from 30:70 to 50:50 from 40:60 to 50:50, from 45:55 to 50:50.

In some embodiments, the total loading dual copper stabilizer is from 0.1 to 15 wt. % based on the total weight of the polyamide resin composition, e.g., from 0.25 to 15 wt. %, from 0.25 to 10 wt. %, from 0.25 to 9 wt. %, from 0.25 to 8 wt. %, from 0.25 to 7 wt. %, from 0.25 to 5 wt. %, from 0.3 to 5 wt. %, from 0.3 to 4 wt. %, from 0.3 to 3 wt. %, from 0.3 to 2.5 wt. %, from 0.3 to 2 wt. %, from 0.3 to 1.5 wt. %, or from 0.3 to 1 wt. %. Thus, in one embodiment, there is provided a polyamide resin composition comprising a resin component containing greater than or equal to 75 wt. % of a polyamide containing an aliphatic diamine having 6 or more carbon atoms and an aliphatic diacid having 6 or more carbon atoms, and less than or equal to 25 wt. % of polyamide containing caprolactam; and a stabilizer component containing a copper complex and a copper salt, wherein the total loading stabilizer component is from 0.1 to 15 wt. %.

In some embodiments, the total loading of the copper complex is from 0.1 to 5 wt. % based on the total weight of the polyamide resin composition, e.g., from 0.1 to 4.5 wt. %, from 0.1 to 4 wt. %, from 0.1 to 3.5 wt. %, from 0.15 to 3 wt. %, from 0.15 to 2.5 wt. %, from 0.15 to 2 wt. %, from 0.15 to 1.5 wt. %, from 0.15 to 1 wt. % or from 0.2 to 0.5 wt. %. Thus, in one embodiment, there is provided a polyamide resin composition comprising a resin component containing greater than or equal to 75 wt. % of a polyamide containing an aliphatic diamine having 6 or more carbon atoms and an aliphatic diacid having 6 or more carbon atoms, and less than or equal to 25 wt. % of polyamide containing caprolactam; and a stabilizer component containing a copper complex and a copper salt, wherein the total loading of the copper complex is from 0.1 to 5 wt. %.

In some embodiments, the total loading of the copper salt is from 0.1 to 5 wt. % based on the total weight of the polyamide resin composition, e.g., from 0.1 to 4.5 wt. %, from 0.1 to 4 wt. %, from 0.1 to 3.5 wt. %, from 0.25 to 3 wt. %, from 0.25 to 2.5 wt. %, from 0.25 to 2 wt. %, from 0.25 to 1.5 wt. %, or from 0.25 to 1 wt. %. Thus, in one embodiment, there is provided a polyamide resin composition comprising a resin component containing greater than or equal to 75 wt. % of a polyamide containing an aliphatic diamine having 6 or more carbon atoms and an aliphatic diacid having 6 or more carbon atoms, and less than or equal to 25 wt. % of polyamide containing caprolactam; and a stabilizer component containing a copper complex and a copper salt, wherein the total loading of the copper salt is from 0.1 to 5 wt. %.

In terms of the total copper, the stabilizer components together provide between 100 and 6000 wppm of copper, e.g., from 500 to 5000 wppm, from 500 to 4500 wppm, from 500 to 4000 wppm, from 500 to 3500 wppm, from 500 to 3000 wppm, or from 1000 to 3000 wppm. When the total copper is loaded at a low level, e.g., less than 100 wppm, the thermal protection is diminished.

The stabilizer components may be compounded together or individually with the polyamide resin component, melt mixed, extruded, and pelletized. In one embodiment, stabilizer components, either both the copper complex and/or copper salt can be added as a masterbatch. The masterbatch may include a polyamide such as the resin component, namely a polyamide containing an aliphatic diamine having 6 or more carbon atoms and an aliphatic diacid having 6 or more carbon atoms, polyamide containing caprolactam, or copolymers thereof. In a preferred embodiments, the copper salt is added as a masterbatch to aid in processing. The masterbatch may comprise from 1 to 15 wt. % copper salt and 75 to 99% of the polyamide, and in particular, a polyamide containing an aliphatic diamine having 6 or more carbon atoms and an aliphatic diacid having 6 or more carbon atoms.

Other Additives

In the embodiments disclosed herein the polyamide resin composition does not contain polyolefins including polymers comprising olefin units, such as ethylene, propylene, butylene or octane, or polyolefins functionalized with epoxy, anhydride or acid function. The polyolefin may be an impact modifiers and impact modifiers are excluded from the polyamide resin compositions disclosed herein. Other impact modifiers that are not polyolefins, are also excluded from the polyamide resin compositions disclosed herein. Some types of impact modifiers, while improving impact strength and stiffness, may result in poor performance for tensile strength.

The disclosed polyamide resin compositions are unfilled (0% filler) in some embodiments. In some cases, the polyamide resin compositions are neat compositions, e.g., there no fillers in the composition, such as glass, carbon fibers, particulate fillers, mineral fillers, etc.

The polyamide resin composition may comprise certain additives that do not impair the heat stabilization properties or other mechanical properties. Suitable additives include lubricants, dyes, pigments, optical brightener, UV stablizers, or mixtures thereof. For purposes of the disclosed embodiments, the additives do not include plasticizers in addition to the impact modifiers described above.

A variety of lubricants may be suitable for use with embodiments of the present invention. Examples of suitable lubricants include stearamides such as ethylene-bis-stearamide, stearates such as zinc stearate, magnesium stearate, calcium stearate, and sodium stearate, polydimethylsiloxane. Particularly suitable additives include zinc stearate and/or ethylene-bis-stearamide. The disclosed polyamide resins compositions are able to effectively produce polyamide structures without requiring high amounts of lubricants typically present in conventional polyamides, thus providing production efficiencies. In some embodiments, the polyamide resin compositions may comprise less than or equal to 20 wt. % lubricants, e.g., less than or equal to 15 wt. %, less than or equal to 10 wt. %, less than or equal to 5 wt. %, less than or equal to 4 wt. %, less than or equal to 3 wt. %, less than or equal to 2.5 wt. %, less than or equal to 2 wt. %, or less than or equal to 1.5 wt. %.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments.

Light stabilizers and/or ultraviolet light (UV) stabilizers may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

The polyamide composition of the present invention can be obtained by mixing the various components generally in a single or twin screw extruder at a temperature sufficient to maintain the polyamide resin in the melt. Generally, the mixture is extruded into rods which are cut into pieces to form granules or pellets. Additives may be added together or separately by mixing polyamide hot or cold. Granules or pellets can be further processed to powder form, for instance, by a grinding with liquid nitrogen.

Performance Characteristics

The aforementioned polyamide resin compositions demonstrate surprising performance for heat aging. For example, the polyamide compositions demonstrate superior tensile performance at high temperatures from 140° C. to 160° C. This allows articles made from the polyamide resin compositions to have exceptional performance. These performance parameters are exemplary and the examples support other performance parameters that are contemplated by the disclosure.

Furthermore, the polyamide resin compositions have been shown to retain mechanical properties when heat aged. This allows, for example, the tensile strength to remain surprisingly high over time and at higher temperatures. In contrast, polyamides without the disclosed stabilizer components exhibit a decrease in tensile strength over time and at higher temperatures.

In some embodiments, the retention of tensile strength after heat aging is at least 80% of the initial tensile strength measured after 1500 hours at a temperature from 140° C. to 160° C., e.g., at least 85%, at least 90%, at least 92%, at least 95%, at least 97.5%, or at least 99%. Thus, the addition of the stabilizer component does not impair the mechanical strength, but provides heat stabilization over a long period of time. In other embodiments, the tensile strength after 1500 hours of heat aging from 140° C. to 160° C. may even be greater than the initial tensile strength, e.g., a retention more than 100%, e.g., more than 101%, more than 102%, more than 103%, more than 104%, more than 105%, more than 110%, or more than 114%.

In some embodiments, the retention of tensile strength after heat aging is at least 80% of the initial tensile strength measured after 2000 hours at a temperature from 140° C. to 160° C. Thus, the addition of the stabilizer component does not impair the mechanical strength, but provides heat stabilization over a long period of time. In some embodiments, the retention of tensile strength after heat aging is at least 85% of the initial tensile strength after 2000 hours at a temperature from 140° C. to 160° C., e.g., at least 90%, at least 92%, at least 95%, at least 97.5%, or at least 99%. In other embodiments, the tensile strength after 2000 hours of heat aging from 140° C. to 160° C. may be greater than the initial tensile strength and such values are also contemplated as being a retention of tensile strength. Thus, in some embodiments, the tensile strength after 2000 hours may be more than 100% of the initial tensile strength, e.g., more than 101%, more than 102%, more than 103%, more than 104%, more than 105%, more than 110%, or more than 114%.

In some embodiments, the retention of tensile strength after heat aging is at least 80% of the initial tensile strength measured after 3000 hours at a temperature from 140° C. to 160° C. Thus, the addition of the stabilizer component does not impair the mechanical strength, but provides heat stabilization over a long period of time. In some embodiments, the retention of tensile strength after heat aging is at least 85% of the initial tensile strength after 3000 hours at a temperature from 140° C. to 160° C., e.g., at least 90%, at least 92%, at least 95%, at least 97.5%, or at least 99%. In other embodiments, the tensile strength after 3000 hours of heat aging from 140° C. to 160° C. may be greater than the initial tensile strength and such values are also contemplated as being a retention of tensile strength. Thus, in some embodiments, the tensile strength after 3000 hours may be more than 100% of the initial tensile strength, e.g., more than 101%, more than 102%, more than 103%, more than 104%, more than 105%, more than 110%, or more than 114%.

In some embodiments, the retention of elongation after heat aging is at least 5% of the initial elongation measured after 1500 hours at a temperature from 140° C. to 160° C. In some embodiments, the retention of elongation after heat aging is at least 25% of the initial elongation after 1500 hours at a temperature from 140° C. to 160° C., e.g., at least 50%, at least 55%, at least 60%, at least 65%, at least 70%, at least 75%, at least 80%, at least 85%, at least 90%, or at least 99%. In other embodiments, the elongation after 1500 hours of heat aging from 140° C. to 160° C. may be greater than the initial elongation and such values are also contemplated as being a retention of elongation. Thus, in some embodiments, the elongation after 1500 hours may be more than 100% of the initial elongation, e.g., more than 101%, more than 102%, more than 103%, more than 104%, more than 105%, more than 110%, or more than 114%.

In some embodiments, the retention of elongation after heat aging is at least 5% of the initial elongation measured after 2000 hours at a temperature from 140° C. to 160° C. In some embodiments, the retention of elongation after heat aging is at least 20% of the initial elongation after 2000 hours at a temperature from 140° C. to 160° C., e.g., at least 25%, at least 50%, at least 55%, at least 60%, at least 65%, at least 70%, at least 75%, at least 80%, at least 85%, at least 90%, or at least 99%.

In some embodiments, the retention of elongation after heat aging is at least 5% of the initial elongation measured after 3000 hours at a temperature from 140° C. to 160° C. In some embodiments, the retention of elongation after heat aging is at least 5% of the initial elongation after 3000 hours at a temperature from 140° C. to 160° C., e.g., at least 7%, at least 10%, at least 12%, at least 15%, at least 20%, at least 25%, at least 50%, at least 55%, at least 60%, at least 65%, at least 70%, at least 75%, at least 80%, at least 85%, at least 90%, or at least 99%.

Polyamide resin composition having PA6, such as in amount from 1 to 25 wt. %, may have a higher initial elongation than compositions without PA6 or an amount of PA6 that is less than 1 wt. %. In some embodiments, the retention of elongation for polyamide resin compositions having PA6 after heat aging is at least 5% of the initial elongation measured after 1500 hours at a temperature from 140° C. to 160° C. In some embodiments, the retention of elongation for polyamide resin compositions having PA6 after heat aging is at least 25% of the initial elongation after 1500 hours at a temperature from 140° C. to 160° C., e.g., at least 50%, at least 55%, at least 60%, at least 65%, at least 70%, at least 75%, at least 80%, at least 85%, at least 90%, or at least 99%. In other embodiments, the elongation after 1500 hours of heat aging from 140° C. to 160° C. may be greater than the initial elongation and such values are also contemplated as being a retention of elongation. Thus, in some embodiments, the elongation after 1500 hours may be more than 100% of the initial elongation, e.g., more than 101%, more than 102%, more than 103%, more than 104%, more than 105%, more than 110%, or more than 114%.

In some embodiments, the retention of elongation for polyamide resin compositions having PA6 after heat aging is at least 5% of the initial elongation measured after 2000 hours at a temperature from 140° C. to 160° C. In some embodiments, the retention of elongation for polyamide resin compositions having PA6 after heat aging is at least 7.5% of the initial elongation after 2000 hours at a temperature from 140° C. to 160° C., e.g., at least 10%, at least 15%, at least 20%, at least 25%, at least 50%, at least 55%, at least 60%, at least 65%, at least 70%, at least 75%, at least 80%, at least 85%, at least 90%, or at least 99%.

In some embodiments, the retention of elongation for polyamide resin compositions having PA6 after heat aging is at least 5% of the initial elongation measured after 3000 hours at a temperature from 140° C. to 160° C. In some embodiments, the retention of elongation for polyamide resin compositions having PA6 after heat aging is at least 5% of the initial elongation after 3000 hours at a temperature from 140° C. to 160° C., e.g., at least 6%, at least 7%, at least 8%, at least 10%, at least 15%, at least 20%, at least 25%, at least 50%, at least 55%, at least 60%, at least 65%, at least 70%, at least 75%, at least 80%, at least 85%, at least 90%, or at least 99%.

In some embodiments, the retention of impact strength, and in particular unnotched charpy impact strength, after heat aging is at least 25% of the initial impact strength measured after 3000 hours at a temperature from 140° C. to 160° C. In some embodiments, the retention of impact strength after heat aging is at least 10% of the initial impact strength after 1500 hours at a temperature from 140° C. to 160° C., e.g., at least 15%, at least 20%, at least 25%, at least 30%, at least 40%, at least 50%, at least 55%, at least 60%, at least 65%, at least 70%, at least 75%, at least 80%, at least 85%, at least 90%, or at least 99%. In other embodiments, the impact strength after 1500 hours of heat aging from 140° C. to 160° C. may be greater than the initial impact strength and such values are also contemplated as being a retention of impact strength. Thus, in some embodiments, the impact strength after 1500 hours may be more than 100% of the initial impact strength, e.g., more than 101%, more than 102%, more than 103%, more than 104%, more than 105%, more than 110%, or more than 114%.

In some embodiments, the retention of impact strength after heat aging is at least 25% of the initial impact strength measured after 2000 hours at a temperature from 140° C. to 160° C. In some embodiments, the retention of impact strength after heat aging is at least 10% of the initial impact strength after 2000 hours at a temperature from 140° C. to 160° C., e.g., at least 15%, at least 20%, at least 25%, at least 30%, at least 40%, at least 50%, at least 55%, at least 60%, at least 65%, at least 70%, at least 75%, at least 80%, at least 85%, at least 90%, or at least 99%.

In some embodiments, the retention of impact strength after heat aging is at least 25% of the initial impact strength measured after 3000 hours at a temperature from 140° C. to 160° C. In some embodiments, the retention of impact strength after heat aging is at least 10% of the initial impact strength after 3000 hours at a temperature from 140° C. to 160° C., e.g., at least 15%, at least 20%, at least 25%, at least 30%, at least 40%, at least 50%, at least 55%, at least 60%, at least 65%, at least 70%, at least 75%, at least 80%, at least 85%, at least 90%, or at least 99%.

Applications

The resulting polyamide composition may be utilized to manufacture a variety of molded articles, fibers and films. The article can be produced, for example, via conventional injection molding, extrusion molding, blow molding, press molding, compression molding, or gas assist molding techniques. In a particular embodiment, the polyamide composition may be used to manufacture electronic cable ties by injection molding techniques. The polyamide resin composition of the present invention can be molded, by, for example, injection molding, into automobile exterior trim parts and building materials usable in an uncoated state, for example, automobile door mirror stay, fashion rail, door handle and handrail parts. Examples of articles that can be made with the provided polyamide compositions include those used in electrical and electronic applications (such as, but not limited to, circuit breakers, terminal blocks, connectors and the like), automotive applications (such as, but not limited to, air handling systems, radiator end tanks, fans, shrouds, and the like), furniture and appliance parts, and wire positioning devices such as cable ties.

In one embodiment, the polyamide resin composition containing the stabilizer component may be used to manufacture electronic cable ties by injection molding techniques. A variety of different cable tie configurations, including self-locking and reuseable, may be manufactured using the polyamide compositions of the present invention.

In some embodiments, any or some of the components disclosed herein may be considered optional. In some cases, the disclosed compositions may expressly exclude any or some of the aforementioned additives in this description, e.g., via claim language. For example claim language may be modified to recite that the disclosed compositions, materials processes, etc., do not utilize or comprise one or more of the aforementioned additives, e.g., the disclosed materials do not comprise a flame retardant or a delusterant. As another example, the claim language may be modified to recite that the disclosed materials do not comprise aromatic polyamide components.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims or the equivalents thereof.

Examples

The present embodiments will now be described in more detail using the following examples and comparative examples. However, the present embodiments are not limited to only these examples.

The raw materials and measurement methods used in the examples and comparative examples are shown below. The raw materials for the polyamide resin component include:

Poly[imino(1,6-dioxohexamethylene) iminohexamethylene] commercially available as poly(hexamethylene adipamide) (PA66);

Poly(azepan-2-one) commercially available as poly (hexano-6-lactam) (PA6); and

Poly[imino(1,6-dioxohexamethylene) iminotetramethylene] commercially available as Stanyl polyamide (PA46) (from DSM).

The raw materials for the stabilizer components include: Bruggolen® H3386 (from Bruggemann) and CuI/KI.

The inventive examples were prepared by combining components as shown in Table 1 and compounding in a twin screw extruder. No fillers or impact modifiers were used in these examples, although this should not be viewed as limiting. In addition, no other polyamide were used in the inventive examples 1-4. PA46 was used in comparative example A. Polymers were melted, additives were added to the melt, and the resultant mixture was extruded and pelletized. Percentages are expressed as weight percentages.

TABLE 1

| Examples | 1 | 2 | 3 | 4 |
| --- | --- | --- | --- | --- |
| PA66 | 99.47 | 99.41% | 79.48% | 79.41% |
| PA6 | — | — | 20% | 20% |
| H3386 | 0.25% | 0.4% | 0.24% | 0.4% |
| CuI/KI | 0.28% | 0.19% | 0.28% | 0.19% |

Panels were formed from the pellets. Each mixture was melt-kneaded using a vented extruder, and extruded into strands. The strands were cooled in a water bath, cut and dried to prepare a pellet-shaped molding material. This molding material was injection-molded at to obtain test panels. The panels were heat aged at multiple temperatures and measured (at various temperatures and heat age times) for retention of tensile strength, tensile elongation, and impact resilience.

Tensile strength was measured in accordance with standard test method ISO 527-2 (2012). Elongation was measured in accordance with standard test method ASTM D882-18 (2018). The unnotched Charpy impact strength was measured in accordance with standard ISO 179 (2010).

Tables 2 and 3 show the superior results in retention of tensile strength and impact strength of Example 3 over comparative example A, which is a PA46 composition that contains 225 wppm of copper. Comparative example A uses only a CuI/KI stabilizer, not a dual stabilizer package. Example 3 had an initial tensile strength of 82.61 MPa and an unnotched charpy impact strength of 189.0 kJ/m$^2$. Comparative example A had an initial tensile strength of 96.34 MPa and an unnotched charpy impact strength of 156.05 kJ/m$^2$. The testing was conducted for an extended period of time over high temperatures.

TABLE 2

Tensile Retention (%)

| Temp. | Example | 1000 hr | 1500 hr | 2000 hr | 2500 hr | 3000 hr | 4000 hr |
|---|---|---|---|---|---|---|---|
| 140° C. | A | | | | 89% | | |
|  | 3 | | | | 100% | | |
| 150° C. | A | | 82% | | | 62% | |
|  | 3 | | 100% | | | 86% | |
| 160° C. | A | 80% | | 69% | | 54% | 37% |
|  | 3 | 101% | | 91% | | 74% | 53% |

TABLE 3

Unnotched Charpy Impact Strength Retention (%)

| Temp. | Example | 1000 hr | 1500 hr | 2000 hr | 2500 hr | 3000 hr | 4000 hr |
|---|---|---|---|---|---|---|---|
| 140° C. | A | 108% | | 44% | | 20% | 16% |
|  | 3 | 100% | | 81% | | 55% | 48% |
| 150° C. | A | 62% | 37% | 34% | 13% | 6% | |
|  | 3 | | 48% | 20% | 13% | 8% | |

Although PA46 showed good heat resistance and moldability, PA46 suffered from problems that lead to deterioration. Even when a stabilizer was added, the heat resistance was shown to contribute to deterioration in mechanical properties over extended periods of time. At 140° C., comparative A shows a significant decrease in impact strength after 2000 hr as compared with Example 3. This trend continues at the higher temperature. Surprisingly and unexpectedly, the retention of mechanical properties of Example 3 with the combination of PA66 and PA6 with the stabilizer component is significantly improved.

Examples 1 and 2, which use the dual copper stabilizer was shown to have an improved retention over a polyamide resin with only one copper source. Comparative example B was a PA66 resin that contained a copper heat stabilizer providing about 150 wppm of copper. For comparative example B, a single copper heat stabilizer was used, namely H3386. The superior results in retention of tensile strength and impact strength for Examples 1 and 2 over comparative example B are shown in Tables 4-6. Example 1 had an initial tensile strength of 77.2 MPa, elongation (%) of 22.4 and an unnotched charpy impact strength of 186.3 kJ/m². Example 2 had an initial tensile strength of 84.2 MPa, elongation (%) of 25.9 and an unnotched charpy impact strength of 185.1 kJ/m². Comparative example B had an initial tensile strength of 84.4 MPa, elongation (%) of 25.4 and an unnotched charpy impact strength of 175.6 kJ/m². The testing was conducted for an extended period of time over high temperatures. Based on the results, the performance for shorter durations of less than 1500 hours, regardless of temperature, tended to be comparable, but as the testing continued for extended periods of time, surprisingly and unexpectedly examples 1 and 2 had better performance as compared with comparative example B when considering tensile reduction, elongation retention, and impact strength together as shown in Tables 4-6.

TABLE 4

Tensile Retention (%)

| Temp. | Example | 500 hr | 1000 hr | 1500 hr | 2000 hr | 2500 hr | 3000 hr |
|---|---|---|---|---|---|---|---|
| 140° C. | B | 104.9% | 104.0% | 103.4% | 104.5% | 107.7% | 104.4% |
|  | 1 | 114.2% | 114.8% | 114.4% | 115.6% | 115.7% | 118.5% |
|  | 2 | 104.6% | 104.3% | 101.9% | 105.7% | 103.9% | 110.7% |
| 150° C. | B | 104.8% | 104.9% | 106.7% | 100.2% | 89.9% | |
|  | 1 | 114.5% | 113.6% | 117.9% | 117.6% | 103.5% | |
|  | 2 | 106.3% | 87.4% | 107.8% | 104.6% | 99.9% | |
| 160° C. | B | 100.4% | 98.7% | 92.4% | 89.9% | 66.0% | 64.4% |
|  | 1 | 116.5% | 112.8% | 114.4% | 106.8% | 89.3% | 82.7% |
|  | 2 | 107.4% | 100.0% | 105.8% | 97.6% | 84.1% | 89.8% |

TABLE 5

% Elongation Retention

| Temp. | Example | 500 hr | 1000 hr | 1500 hr | 2000 hr | 2500 hr | 3000 hr |
|---|---|---|---|---|---|---|---|
| 140° C. | B | 119.0% | 112.9% | 82.6% | 80.8% | 91.7% | 80.4% |
|  | 1 | 147.9% | 112.8% | 96.1% | 113.1% | 91.2% | 71.3% |
|  | 2 | 91.2% | 97.8% | 82.9% | 99.7% | 62.1% | 84.0% |
| 150° C. | B | 90.3% | 82.4% | 69.3% | 18.5% | 15.0% | |
|  | 1 | 119.9% | 91.8% | 94.2% | 82.1% | 42.0% | |
|  | 2 | 98.3% | 79.4% | 84.2% | 56.0% | 28.2% | |
| 160° C. | B | 62.5% | 22.1% | 16.1% | 14.7% | 9.5% | 7.6% |
|  | 1 | 118.9% | 89.8% | 29.6% | 24.0% | 14.6% | 10.7% |
|  | 2 | 100.3% | 59.6% | 58.4% | 21.1% | 12.6% | 11.5% |

TABLE 6

Unnotched Charpy Impact Strength Retention (%)

| Temp. | Example | 500 hr | 1000 hr | 1500 hr | 2000 hr | 2500 hr | 3000 hr |
|---|---|---|---|---|---|---|---|
| 140° C. | B | 107.0% | 92.1% | Not tested | 64.2% | 84.2% | |
|  | 1 | 101.0% | 100.8% | 80.2% | 78.6% | 99.4% | 87.5% |
|  | 2 | 101.1% | 95.8% | 101.5% | Not reported | 80.4% | 81.8% |
| 150° C. | B | 107.5% | 87.9% | Not tested | 25.6% | 9.8% | |
|  | 1 | 87.7% | 81.6% | 70.5% | 43.2% | 56.7% | |
|  | 2 | 102.1% | 102.8% | 85.1% | 100.6% | 23.4% | |
| 160° C. | B | 107.5% | 16.6% | Not tested | 12.4% | 7.4% | 5.6% |
|  | 1 | 87.4% | 60.6% | 41.2% | 46.7% | 13.0% | 9.3% |
|  | 2 | 84.9% | 86.9% | 30.4% | 16.0% | 10.2% | 8.7% |

Tables 4-6 demonstrate the superior results in retention of tensile strength, elongation and impact strength of the polyamide resin having the stabilizer components disclosed herein in Example 1 and 3 over comparative example B, especially at higher temperatures and for extended periods of time.

Examples 3 and 4 further add PA6 with the stabilizer component with two different copper sources is shown to have an improved retention over a polyamide resin with only one copper source. Comparative example C is a copolymer of PA66 and PA6 is a similar ratio as Examples 3 and 4. Comparative example C contains a copper heat stabilizer that provides about 150 wppm of copper. The superior results in retention of tensile strength and impact strength of the polyamide resin having the stabilizer components disclosed herein in Examples 3 and 4 over comparative example C in shown in Tables 7-9. The incorporation of PA6 improves the initial elongation values. Example 3 had an initial tensile strength of 78.1 MPa, elongation (%) of 38.0 and an unnotched charpy impact strength of 189.9 kJ/m². Example 4 had an initial tensile strength of 79.5 MPa, elongation (%) of 43.1 and an unnotched charpy impact strength of 188.6 kJ/m². Comparative example C had an initial tensile strength of 78.69 MPa, elongation (%) of 40.4 and an unnotched charpy impact strength of 186.5 kJ/m². The testing was conducted for an extended period of time over high temperatures. Based on the results, the performance for shorter durations of less than 1500 hours, regardless of temperature, tended to be comparable, but as the testing continued for extended periods of time, surprisingly and unexpectedly examples 3 and 4 had better performance as compared with comparative example CO when considering tensile reduction, elongation retention, and impact strength together as shown in Tables 7-9.

TABLE 7

Tensile Retention (%)

| Temp. | Example | 500 hr | 1000 hr | 1500 hr | 2000 hr | 2500 hr | 3000 hr |
|---|---|---|---|---|---|---|---|
| 140° C. | C | 102.7% | 102.3% | 103.0% | 103.8% | 97.2% | 104.4% |
| | 3 | 105.8% | 104.2% | 104.0% | 105.4% | 105.0% | 109.3% |
| | 4 | 102.0% | 101.8% | 101.9% | 103.1% | 98.0% | 107.3% |
| 150° C. | C | 103.3% | 103.1% | 94.7% | 86.0% | 80.4% | |
| | 3 | 105.5% | 105.8% | 107.1% | 98.9% | 105.4% | 110.9% |
| | 4 | 103.2% | 102.7% | 104.7% | 105.9% | 99.7% | 92.3% |
| 160° C. | C | 105.9% | 104.8% | 93.4% | 80.3% | 62.3% | 54.5% |
| | 3 | 107.5% | 106.0% | 106.3% | 96.6% | 86.2% | 79.4% |
| | 4 | 104.2% | 105.6% | 100.7% | 96.7% | 94.1% | 76.5% |

TABLE 8

% Elongation Retention

| Temp. | Example | 500 hr | 1000 hr | 1500 hr | 2000 hr | 2500 hr | 3000 hr |
|---|---|---|---|---|---|---|---|
| 140° C. | C | 112.4% | 74.8% | 91.4% | 87.8% | 33.4% | 37.8% |
| | 3 | 108.4% | 117.0% | 89.4% | 96.4% | 64.0% | 78.7% |
| | 4 | 99.8% | 94.2% | 84.8% | 79.2% | 44.1% | 56.3% |
| 150° C. | C | 107.2% | 84.3% | 25.9% | 22.0% | 7.8% | |
| | 3 | 100.0% | 88.7% | 79.6% | 28.3% | 37.3% | 48.3% |
| | 4 | 108.7% | 65.3% | 47.5% | 52.2% | 28.6% | 10.1% |
| 160° C. | C | 77.9% | 42.5% | 15.9% | 7.9% | 5.5% | 4.1% |
| | 3 | 90.5% | 59.5% | 54.0% | 10.7% | 8.7% | 6.4% |
| | 4 | 92.8% | 76.2% | 43.5% | 16.3% | 9.3% | 5.6% |

TABLE 9

Unnotched Charpy Impact Strength Retention (%)

| Temp. | Example | 500 hr | 1000 hr | 1500 hr | 2000 hr | 2500 hr | 3000 hr |
|---|---|---|---|---|---|---|---|
| 140° C. | C | 100.2% | 99.2% | 99.5% | 35.1% | 8.9% | 9.3% |
| | 3 | 99.2% | 99.0% | 100.0% | 79.4% | 76.2% | 35.3% |
| | 4 | 99.7% | 99.3% | 100.9% | 100.9% | 42.2% | 17.1% |
| 150° C. | C | 99.9% | 12.0% | 7.1% | 6.3% | 3.9% | |
| | 3 | 99.5% | 101.1% | 73.8% | 39.4% | 9.0% | 9.0% |
| | 4 | 100.1% | 81.4% | 10.4% | 16.4% | 7.4% | 10.1% |
| 160° C. | C | 12.8% | 7.1% | 6.0% | 4.0% | 3.0% | 1.7% |
| | 3 | 59.7% | 14.1% | 15.9% | 14.5% | 9.5% | 5.3% |
| | 4 | 14.9% | 12.9% | 15.3% | 9.3% | 5.8% | 3.6% |

Tables 7-9 demonstrate the superior results in retention of tensile strength, elongation and impact strength of the polyamide resin having the stabilizer components disclosed herein in Example 3 and 4 over comparative example C, especially at higher temperatures and for extended periods of time.

Embodiments

As used below, any reference to a series of embodiments is to be understood as a reference to each of those embodiments disjunctively (e.g., "Embodiments 1-4" is to be understood as "Embodiments 1, 2, 3, or 4").

Embodiment 1 is a polyamide resin composition comprising a resin component containing greater than or equal to 75 wt. % of a polyamide containing an aliphatic diamine having 6 or more carbon atoms and an aliphatic diacid having 6 or more carbon atoms, and less than or equal to 25 wt. % of polyamide containing caprolactam; and a stabilizer component containing a copper complex and a copper salt, wherein the amount of copper provided by the copper complex and copper salt is in a weight ratio from 10:90 to 90:10, and more preferably from 40:60 to 60:40.

Embodiment 2 is the composition of embodiment 1, wherein the copper complex comprises a ligand and/or a halogenated organic compound.

Embodiment 3 is the composition of embodiment 2, wherein the ligand is a phosphine, mercaptobenzimidazole, acetylacetonate, glycine, ethylenediamine, oxalate, diethylenediamine, triethylenetetraamine, ethylenediaminetetraacetic acid, pyridine, diphosphone, dipyridyl, or mixtures thereof.

Embodiment 4 is the composition of embodiment 3, wherein the phosphine is tributylphosphine, triphenylphosphine, or mixtures thereof.

Embodiment 5 is the composition of embodiments 2-4, wherein the halogenated organic compound is a bromine-based compound.

Embodiment 6 is the composition of embodiments 1-5, wherein the copper complex has a total amount of copper that is from 10 to 1000 wppm based on the total weight of the copper complex.

Embodiment 7 is the composition of embodiments 1-6, wherein the copper salt is cuprous iodide, cuprous cyanide, cupric acetate, cupric stearate, or mixtures thereof.

Embodiment 8 is the composition of embodiments 1-7, wherein the copper salt further comprises an alkali metal halide.

Embodiment 9 is the composition of embodiment 8, wherein the alkali metal halide is lithium iodide, sodium iodide, or potassium iodide, or mixtures thereof.

Embodiment 10 is the composition of embodiments 1-9, wherein the total halogen loading is less than or equal to 5 wt. % based on the total weight of the polyamide resin composition.

Embodiment 11 is the composition of embodiments 1-10, wherein the resin component comprises from 75 to 100% of the polyamide containing an aliphatic diamine having 6 or more carbon atoms and an aliphatic diacid having 6 or more carbon atoms.

Embodiment 12 is the composition of embodiments 1-11, wherein the resin component comprises from 0 to 25% of the polyamide containing caprolactam.

Embodiment 13 is the composition of embodiments 1-12, wherein the resin component is in an amount from 70 to 99.5 wt. % based on the total weight of the polyamide resin composition.

Embodiment 14 is the composition of embodiments 1-13, wherein the stabilizer component is in an amount from 0.1 to 15 wt. % based on the total weight of the polyamide resin composition.

Embodiment 15 is the composition of embodiments 1-14, wherein the copper complex is in an amount from 0.1 to 5 wt. % based on the total weight of the polyamide resin composition.

Embodiment 16 is the composition of embodiments 1-15, wherein the copper salt is in an amount from 0.1 to 5 wt. % based on the total weight of the polyamide resin composition.

Embodiment 17 is the composition of embodiments 1-16, wherein the resin composition further comprises a lubricant, dye, pigment, optical brightener, UV stabilizer, or combinations thereof.

Embodiment 18 is the composition of embodiments 1-17, wherein the resin composition is a non-filled composition, i.e. no fillers or other reinforcing materials are used.

Embodiment 19 is the composition of embodiments 1-18, wherein the resin composition contains no polyolefins.

Embodiment 20 is the composition of embodiments 1-19, wherein the resin composition contains no impact modifiers.

Embodiment 21 is the composition of embodiments 1-20, wherein the resin composition contains no plasticizers.

Embodiment 22 is the composition of embodiments 1-21, wherein the polyamide resin composition maintains at least 80% of the initial tensile strength after 1500 hours at a temperature from 140° C. to 160° C.

Embodiment 23 is the composition of embodiments 1-22, wherein the polyamide resin composition maintains at least 5% of the initial elongation after 1500 hours at a temperature from 140° C. to 160° C.

Embodiment 24 is the composition of embodiments 1-23, wherein the polyamide resin composition maintains at least 25% of the initial impact strength after 3000 hours at a temperature from 140° C. to 160° C.

Embodiment 25 is an article formed form the polyamide resin composition of embodiments 1-24.

Embodiment 26 is the article of embodiment 25, wherein the article is a fastener, circuit breaker, terminal block, connector, automotive interior component, automotive engine component, furniture part, appliance part, cable tie, sports equipment, gun stock, window thermal break, aerosol valve, food film packaging, or electrical/electronic component.

Embodiment 27 is a cable tie made from a polyamide resin composition, the polyamide resin composition comprising a resin component containing greater than or equal to 75 wt. % of a polyamide containing an aliphatic diamine having 6 or more carbon atoms and an aliphatic diacid having 6 or more carbon atoms, and less than or equal to 25 wt. % of polyamide containing caprolactam; and a stabilizer component containing a copper complex and a copper salt, wherein the amount of copper provided by the copper complex and copper salt is in a weight ratio from 10:90 to 90:10.

Embodiment 28 is the cable tie of embodiment 27, wherein the copper complex comprises a ligand and/or a halogenated organic compound.

Embodiment 29 is the cable tie of embodiment 28, wherein the ligand is a phosphine, mercaptobenzimidazole, acetylacetonate, glycine, ethylenediamine, oxalate, diethylenediamine, triethylenetetraamine, ethylenediaminetetraacetic acid, pyridine, diphosphone, dipyridyl, or mixtures thereof.

Embodiment 30 is the cable tie of embodiment 29, wherein the phosphine is tributylphosphine, triphenylphosphine, or mixtures thereof.

Embodiment 31 is the cable tie of embodiments 28-29, wherein the halogenated organic compound is a bromine-based compound.

Embodiment 32 is the cable tie of embodiments 27-31, wherein the copper complex has a total amount of copper that is from 10 to 1000 wppm based on the total weight of the copper complex.

Embodiment 33 is the cable tie of embodiments 27-32, wherein the copper salt is cuprous iodide, cuprous cyanide, cupric acetate, cupric stearate, or mixtures thereof.

Embodiment 34 is the cable tie of embodiments 27-33, wherein the copper salt further comprises an alkali metal halide.

Embodiment 35 is the cable tie of embodiment 34, wherein the alkali metal halide is lithium iodide, sodium iodide, or potassium iodide, or mixtures thereof.

Embodiment 36 is the cable tie of embodiments 27-35, wherein the total halogen loading is less than or equal to 5 wt. % based on the total weight of the polyamide resin composition.

Embodiment 37 is the cable tie of embodiments 27-36, wherein the resin component comprises from 75 to 100% of the polyamide containing an aliphatic diamine having 6 or more carbon atoms and an aliphatic diacid having 6 or more carbon atoms.

Embodiment 38 is the cable tie of embodiments 27-37, wherein the resin component comprises from 0 to 25% of the polyamide containing caprolactam.

Embodiment 39 is the cable tie of embodiments 27-38, wherein the resin component is in an amount from 70 to 99.5 wt. % based on the total weight of the polyamide resin composition.

Embodiment 40 is the cable tie of embodiments 27-39, wherein the stabilizer component is in an amount from 0.1 to 15 wt. % based on the total weight of the polyamide resin composition.

Embodiment 41 is the cable tie of embodiments 27-40, wherein the copper complex is in an amount from 0.1 to 5 wt. % based on the total weight of the polyamide resin composition.

Embodiment 42 is the cable tie of embodiments 27-41, wherein the copper salt is in an amount from 0.1 to 5 wt. % based on the total weight of the polyamide resin composition.

Embodiment 43 is the cable tie of embodiments 27-42, wherein the resin composition further comprises a lubricant, dye, pigment, optical brightener, UV stabilizer, or combinations thereof.

Embodiment 44 is the cable tie of embodiments 27-43, wherein the resin composition is a non-filled composition, i.e. no fillers or other reinforcing materials are used.

Embodiment 45 is the cable tie of embodiments 27-44, wherein the resin composition contains no polyolefins.

Embodiment 46 is the cable tie of embodiments 27-45, wherein the resin composition contains no impact modifiers.

Embodiment 47 is the cable tie of embodiments 27-46, wherein the resin composition contains no plasticizers.

Embodiment 48 is the cable tie of embodiments 27-47, wherein the polyamide resin composition maintains at least 80% of the initial tensile strength after 1500 hours at a temperature from 140° C. to 160° C.

Embodiment 49 is the cable tie of embodiments 27-48, wherein the polyamide resin composition maintains at least 5% of the initial elongation after 1500 hours at a temperature from 140° C. to 160° C.

Embodiment 50 is the cable tie of embodiments 27-49, wherein the polyamide resin composition maintains at least 25% of the initial impact strength after 3000 hours at a temperature from 140° C. to 160° C.

We claim:

1. A polyamide resin composition consisting of:
   a resin component consisting of at least 75 wt. % of a polyamide formed from an aliphatic diamine having 6 or more carbon atoms and an aliphatic diacid having 6 or more carbon atoms, and no more than 25 wt. % of polyamide formed from caprolactam;
   a copper complex; and
   a copper salt and alkali metal halide, wherein the amount of copper provided by the copper complex and copper salt is in a weight ratio from 10:90 to 90:10; and
   additives selected from the group consisting of lubricants, dyes, pigments, optical brightener, UV stabilizers, and mixtures thereof.

2. The composition of claim 1, wherein the copper complex consists of copper bound by a ligand.

3. The composition of claim 2, wherein the ligand is a phosphine, mercaptobenzimidazole, acetylacetonate, glycine, ethylenediamine, oxalate, diethylenediamine, triethylenetetraamine, ethylenediaminetetraacetic acid, pyridine, diphosphone, dipyridyl, or mixtures thereof.

4. The composition of claim 3, wherein the phosphine is tributylphosphine, triphenylphosphine, or mixtures thereof.

5. The composition of claim 1, wherein the copper complex has a total amount of copper that is from 10 to 1000 wppm based on the total weight of the copper complex.

6. The composition of claim 1, wherein the copper salt is cuprous iodide, cuprous cyanide, cupric acetate, cupric stearate, or mixtures thereof.

7. The composition of claim 1, wherein the alkali metal halide is lithium iodide, sodium iodide, or potassium iodide, or mixtures thereof.

8. The composition of claim 1, wherein the total halogen loading is less than or equal to 5 wt. % based on the total weight of the polyamide resin composition.

9. The composition of claim 1, wherein the copper complex has a copper ion bound to a halogenated organic group.

10. The composition of claim 9, wherein the halogenated organic group is a bromine-based group.

11. The composition of claim 1, wherein the resin component is in an amount from 70 to 99.5 wt. % based on the total weight of the polyamide resin composition.

12. The composition of claim 1, wherein the copper complex is in an amount from 0.1 to 5 wt. % based on the total weight of the polyamide resin composition.

13. The composition of claim 1, wherein the copper salt is in an amount from 0.1 to 5 wt. % based on the total weight of the polyamide resin composition.

14. The composition of claim 1, wherein the polyamide resin composition maintains at least 80% of the initial tensile strength after 1500 hours at a temperature from 140° C. to 160° C.

15. The composition of claim 1, wherein the polyamide resin composition maintains at least 5% of the initial elongation after 1500 hours at a temperature from 140° C. to 160° C.

16. The composition of claim 1, wherein the polyamide resin composition maintains at least 25% of the initial impact strength after 3000 hours at a temperature from 140° C. to 160° C.

17. A cable tie made from the polyamide resin composition of claim 1.

18. The cable tie of claim 17, wherein the cable tie is formed using injection molding.

* * * * *